United States Patent [19]
Szeremeta

[11] Patent Number: 5,796,542
[45] Date of Patent: Aug. 18, 1998

[54] SERVO-TRACK WRITER SYSTEM HAVING A PLURALITY OF ENGAGING PINS CO-AXIALLY ROTATED WITH HEAD ACTUATOR PIVOT AXES

[75] Inventor: Wally Szeremeta, Mission Viejo, Calif.

[73] Assignee: Western Digital Corporation, Irvine, Calif.

[21] Appl. No.: 608,391

[22] Filed: Feb. 28, 1996

[51] Int. Cl.$^6$ .................................................. G11B 5/596
[52] U.S. Cl. ........................... 360/77.02; 360/98.02; 360/98.07; 360/106; 360/75
[58] Field of Search ........................ 360/75, 77.02, 360/77.06, 77.08, 51, 86, 97.01, 98.01, 98.02, 98.07, 99.08, 78.04, 78.12, 106

[56] References Cited

U.S. PATENT DOCUMENTS

| | | | |
|---|---|---|---|
| 3,838,457 | 9/1974 | Palmer | 360/78 |
| 4,920,442 | 4/1990 | Dimmick | 360/137 |
| 4,980,783 | 12/1990 | Moir et al. | 360/77.02 |
| 5,227,930 | 7/1993 | Thanos et al. | 360/78.04 |
| 5,448,429 | 9/1995 | Cribbs et al. | 360/75 |
| 5,465,182 | 11/1995 | Ishikawa | 360/75 |

OTHER PUBLICATIONS

C. Lee, "Servowriters: A Critical Tool in Hard Disk Manufacturing", *Solid State Technology*, May 1991, pp. 207–211.
R. Freedland et al., "Servo Writers ... the Pros and Cons of Different Approaches", Hewlett Parckard Data Storage Symposium, pp7-1 -7-31 Feb. 1991.

*Primary Examiner*—Andrew L. Sniezek
*Attorney, Agent, or Firm*—Leo J. Young; Milad G. Shara

[57] ABSTRACT

An apparatus and method useful in a servo-track writer (STW) system for simultaneous servowriting of tracks on disk surfaces in a plurality of disk drive head assemblies (HDAs). The STW system includes a motor disposed to turn a drive shaft on a shaft axis. The drive shaft is supported in a base air bearing and coupled to a rotatable elongated push-tower apparatus such that shaft rotation causes rotation of the push-tower apparatus on a STW bearing axis disposed coaxially with the shaft axis. The push-tower apparatus includes an externally-fixed retroreflector displacement sensor and a plurality of fixed HDA actuator arm engaging pins each disposed to engage one of a plurality of HDAs mounted in alignment in a stationary HDA positioning apparatus. Push-tower rotation moves each engaging pin into contact with a respective HDA actuator arm, moving the actuator arm to a position that is determined by processing position information feedback from the push-tower retroreflector displacement sensor. The rotatable push-tower apparatus is supported at the end opposite the base air bearing by a self-aligning distal air bearing. The invention coaxially aligns each HDA actuator arm pivot axis with the STW bearing axis and the respective engaging pin axis to reduce head-positioning errors caused by retroreflector sensor transmission error and supports the distal push-tower shaft with a self-aligning air bearing to reduce head-positioning errors caused by friction noise.

13 Claims, 7 Drawing Sheets

5,796,542

SERVO-TRACK WRITER SYSTEM HAVING A PLURALITY OF ENGAGING PINS CO-AXIALLY ROTATED WITH HEAD ACTUATOR PIVOT AXES

CROSS-REFERENCE TO RELATED APPLICATIONS

This application is related by subject matter and inventorship to the commonly-assigned U.S. patent application Ser. No. 08/608,395 entitled *Self-Aligning Air Bearing for Use with Servo-Track Writer* filed concurrently herewith by W. Szeremeta and entirely incorporated herein by this reference.

BACKGROUND OF THE INVENTION

1. Field of the Invention

This invention related generally to disk drive servo track recording systems and particularly to a precision servo-track writing apparatus for simultaneous servowriting in a plurality of disk drives.

2. Description of the Related Art

Success in the disk drive industry required meeting market demand for increased density at reduced cost. Profitability requires rapid time-to-market. The hard disk drive industry is widely known for its short product life cycles, rapid improvement and innovation, and fierce price competition in established products. These factors require storage capacity improvements that can be quickly implemented in large numbers of disk drives during manufacture without slowing production.

There has been considerable recent research and development effort directed toward producing disk drives capable of storing more and more data. At the advent of the popular personal computer trend, in the early 1980's, disk drive data storage capacities of 10 to 20 Megabytes were considered adequate. Currently, disk drive capacities of 850 Megabytes are used in notebook computers, while disk drive capacities of 1.6 Gigabytes and more are seen in desktop microcomputers. The demand for higher capacity disk drives shows no signs of abating and ever newer storage-hungry operating systems and applications appear likely to continue to fuel demand.

A trivial way to increase disk storage capacity is to merely increase the size and/or number of disk surfaces available for storing data. However this runs contrary to consumer demand for smaller disk drive volume, which necessarily limits the size and number of available storage disks. In particular, there is a continuing demand for ever smaller disk drives arising from the consumer appetite for ever smaller notebook and laptop computers with ever larger data storage capacity.

One recognized way to satisfy both the demand for smaller size and the demand for larger storage capacity is to increase the areal recording density of the disk surfaces used to store data. The areal recording density of a disk surface is equal to the product of track density, expressed in tracks per millimeter (tpmm) or tracks per inch (tpi) and the linear bit density for each track, expressed in bits per millimeter (bpmm) or bits per inch (bpi). The track spacing decreases as track density increases so that available track density is usually limited by the available accuracy and precision of the radial read/write head positioning mechanism. As track density increases, more accurate positioning of the head over the centerline of the track is necessary to avoid inadvertently reading or writing in the wrong track. So, in general, high disk drive storage capacities require closely-spaced narrow tracks having high linear bit densities and the capability to position the read/write heads with great precision.

To appreciate the necessary head positioning accuracy, it is useful to consider a numerical example. For a disk surface with a track density of about 80 tpmm (2000 tpi), the space allocable to each track (track pitch) is about 12.5 microns (500 microinches). A typical design goal in such an application is to provide a total operational head positioning accuracy of 10% (±5%) of the track pitch, which limits positioning errors from all causes to less than about 1250 nanometers (50 microinches) in this example.

Available disk drive track density, which has historically increased by about 60% every year, is now approaching 250 tpmm (6000 tpi). The necessary head positioning accuracy for 250 tpmm is about 4 microns (16 microinches), which exceeds the capability of the open-loop stepper motors and mechanical positioning systems used for head positioning in early disk drives having track densities of perhaps 8 tpmm (200 tpi). To circumvent the positioning inadequacies of strictly mechanical systems, practitioners long ago introduced closed-loop servo-positioning schemes that use positioning information written directly on the disk surfaces during manufacture. During drive operation, a precision servosystem uses the recorded servo-positioning information to generate a feedback signal useful for properly locating the read/write head on the disk surface. Such servo-positioning information is referred to in the art as a "servopattern." A feedback signal (servo data) generated responsive to the servopattern read from the disk surface is used to drive an actuator motor that causes rotation about a pivot axis of an actuator arm to which read/write heads are attached, thereby positioning the heads with respect to the disk surface.

The recorded servopattern could, for example, include a pattern of two analog burst signals, A and B, written between and spatially overlapping each data track pair. These servo signals are read by the positioned head and compared by the drive control circuitry to assess whether the head is centered on a data track (precisely between the two A and B servo burst signals). An error signal representing the difference in amplitude between the two servo burst signals is generated and used to drive the actuator in a direction that reduces the head position error. The servopattern may be either "embedded" on each disk surface or "dedicated" to one disk surface for use in head positioning for all other disk surfaces in the disk drive. Whether the servopattern is in embedded or dedicated, it must be precisely and accurately written during manufacture before the disk drive can be used to store data. The equipment typically used to write the servo-positioning information in a disk drive is in the art referred to as a "servowrite" or "servo-track writer" (STW). Herein, such equipment is denominated a servo-track writer (STW).

The STW art can be appreciated with reference to, for instance, "*Servo Writers . . . the Pros and Cons of Different Approaches*" by Richard Freedland et al. (Proceedings of the Hewlett Packard Data Storage Symposium, 1991, Paper #7, pp. 7.1–7.19) and "*Servowriters: A Critical Tool in Hard Disk Manufacturing*" by Clayton Lee (*Solid State Technology*, May 1991, pp. 207–211). STW positioning accuracy is critical to hard disk manufacturing yields because even small servopattern position errors impair head positioning in modern high-density disk drives. Some portion of the operational head-positioning error is introduced as servopattern error by the STW itself because of imperfections in the recording system. These error contributions have until now been relatively minor and practitioners in the art have merely tolerated the underlying STW imperfections. This is no longer acceptable with recent increases in track and bit densities.

Tolerable STW error contributions are typically limited to 10% of the entire operational tracking error budget for the disk drive. Recalling that total tracking error budget is typically 10% of track pitch, the STW system error contribution is then limited to 1% of the track pitch. In the above example, a disk drive with a track density of about 80 tpmm (2000 tpi) has a track pitch of about 12.5 micrometers (500 microinches) and an operational head-positioning error budget of about 1250 nanometers (50 microinches). Accordingly, the STW system error contribution is limited to 125 nanometers (5.0 microinches). Similarly, STW system head-positioning error contributions are limited to 40 nanometers (1.6 microinches) in a disk drive having a track density of about 250 tpmm. These STW positioning error limit calculations can be inverted to compute the maximum track density possible for a specified STW head-positioning error limit. For example, an STW system that contributes up to 125 nanometers (5.0 microinches) of head-positioning error cannot be used in the manufacture of disk drives having track densities over about 80 tpmm (2000 tpi), a value too low to satisfy existing market demands for high data storage densities.

It is important that efforts to meet demands for greater storage density not compromise existing capability to manufacture high volumes of disk drives. To avoid unacceptable losses in disk drive manufacturing volume, improvements in STW accuracy must be provided without reducing available rates of manufacturing throughput. FIG. 1 provides a schematic representation of a STW system 12 proposed by practitioners in the art to overcome earlier disk drive production capacity limitations. STW system 12 is a well-known horizontally-oriented STW for simultaneously writing servo data to more than one disk drive and is now described in detail sufficient to appreciate the "transmission error" problem known in the STW art.

As shown, STW system 12 includes a horizontal flat bed 14 on which STW system 12 can write servo-track information simultaneously in up to four disk drive head-disk assemblies (HDA's) 16a, 16b, 16c, and 16d. Each HDA 16a–d occupies one quadrant of flat bed 14 and each has at least one recording disk 18a, 18b, 18c, and 18d, respectively, turned by a respective spindle motor 20a, 20b, 20c, and 20d. Each HDA 16a–d is equipped with a respective head actuator arm 22a, 22b, 22c, and 22d disposed to pivot about a respective pivot axis 24a, 24b, 24c, and 24d and coupled at one end to a respective read/write head 26a, 26b, 26c, and 26d and at the other end to a respective actuator motor (not shown). Each actuator arm 22a–d in FIG. 1 may represent a stacked plurality of head actuator arms (not shown) each having a stacked plurality of heads (not shown) to address a plurality of rotating disk surfaces (not shown) in the respective HDA. Because such a stacked actuator arm plurality all turn simultaneously on the same pivot axis, reference to a single actuator arm herein denotes any and all such commonly-pivoted arms in the same HDA.

During a servo-track writing operation, a respective engaging pin 28a, 28b, 28c, and 28d pushes the corresponding actuator arm 22a–d responsive to rotation of a rotary stage 30, which is controlled in accordance with a position-error feedback signal generated by a laser-transducer interferometer such as the Model hp-5517B sold by Hewlett Packard Corporation of Palo Alto, Calif. A back-bias current is applied to the corresponding actuator motor (not shown) to hold the respective actuator arm 22a–d in place against the respective engaging pin 28a–d, each of which is coupled through a separate bell-shaped structure (not shown) to rotary stage 30, which is turned by a system motor (not shown) on a STW bearing axis 32, the alignment of which is disposed by operation of a base air bearing 34. Respective engaging pin 28a–d pushes its respective actuator arm 22a–d as rotary stage 30 turns on STW bearing axis 32.

All four HDAs 16a–d operate in substantially the same fashion. Considering for simplicity an exemplary HDA 16 alone, note that actuator arm 22 is disposed to pivot about a pivot axis 24 so that head 26 describes an arcuate path about pivot axis 24, usually responsive to the operation of an actuator motor (not shown). During a servo-track writing operation, actuator arm 22 is pushed about the same pivot axis 24 by engaging pin 28 instead of by the operation of an actuator motor (not shown). Engaging pin 28 is coupled through another structure (not shown) to rotary stage 30 on which is fixed a retroreflector displacement sensor 36 for use in measuring angular displacement of rotary stage 30 as it turns about STW bearing axis 32. As rotary stage 30 turns, retroflector sensor 36 moves in an arcuate path about STW bearing axis 32, engaging and turning actuator arm 22 to displace head 26 relative to the surface of disk 18 on an arcuate path about pivot axis 24. Note that pivot axis 24 is not collocated with STW bearing axis 32.

A laser transducing system 37 for measuring angular displacement of rotary stage 30 includes a laser head 38, an interferometer mirror 40, a receiver 42, retroreflector sensor 36, and the supporting laser electronics 44. Laser head 38 sends a laser beam 46 through mirror 40 where it is split into a transmitted beam 48a, which is directed along a "measurement path" to retroreflector sensor 36, and a transmitted beam 48b, which is directed along a "fixed path" to receiver 42. Retroreflector sensor 36 reflects most of transmitted beam 48a back to mirror 40 as a reflected beam 50a, which then directs a portion of this to receiver 42 as a reflected beam 50b. As retroreflector sensor 36 circles about STW bearing axis 32, the interference at receiver 42 of reflected beam 50a and transmitted beam 50b changes accordingly. Receiver 42 uses a polarizer (not shown) and other well-known elements for comparing the phase difference between transmitted beam 48b and reflected beam 50a to generate an electrical signal on a signal line 52 representing the phase difference, which incorporates information representing the precise position (and displacement) of retroreflector sensor 36. Because the displacement of head 26 is related mathematically to retroreflector sensor 36 displacement, the electrical signal on line 52 also includes information representing the precise position of head 26 with respect to the surface of disk 18. STW system 12 includes other elements (not shown) for sending servo-writing signals to head 26 responsive to the positioning information in the signal on line 52, thereby ensuring accurate positioning of servopatterns in the surface of disk 18. The polarizer in receiver 42 can selectively filter reflected beam 50b because its frequency is "Doppler-shifted" by movement of retroreflector sensor 36 in the measurement path.

Disadvantageously, as clearly shown in FIG. 1, engaging pin 28 and actuator arm 22 circle about different axes, producing an unwanted change in the relationship between the positions of head 26 and retroreflector sensor 36 manifested as a "transmission error" introduced by STW system 12. There is also some head-positioning error contributed by frictional drag as engaging pin 28 pushes against actuator arm 22.

The head-positioning accuracy of horizontal STW system 12 (FIG. 1) has been shown by researchers to be within 83 nanometers (3.3 microinches). If allowable STW system error contribution is 1% of track width, this accuracy limits the use of STW system 12 to disk surfaces with track densities of no more than 120 tpmm (3000 tpi). Clearly, such a head-positioning error is unacceptable for producing the modern 240 tpmm (6000 tpi) disk. The STW system servopattern error is largely a result of this so-called "transmission error" arising from differential displacement of retroreflector sensor 36 and heads 26a–d during STW operation.

FIG. 2 shows a free-body representation of the geometric relationship between exemplary actuator arm 22 of HDA 16 in horizontal STW system 12 (FIG. 1) and corresponding engaging pin 28. Because operational factors are the same for each HDA 16a–d, for simplicity only the exemplary relationship is described here. Retroreflector sensor 36 shares STW bearing axis 32 with engaging pin 28. Read/write head 26 in actuator arm 22 circles about pivot axis 24. The "transmission factor" is expressed as a function of the orthogonal offsets $\Delta X$ and $\Delta Y$ between STW bearing axis 32 and pivot axis 24 and the linear distance between read/write head 26 and retroreflector sensor 36. This STW-induced error arises from the uncontrolled change in relationship between the position of head 26 and retroreflector sensor 36 during rotation of rotary stage 30. Only by collocating STW bearing axis 32 and pivot axis 24 (mathematically or mechanically) can this transmission factor error be avoided and such collocation in practice requires some form of realignment or self-alignment capability at one of the two axes, which until now has been unknown in the STW art.

Head-positioning error may also arise in STW system 12 from "frictional noise" sources such as frictional drag of pin 28 against actuator arm 22 or in base air bearing 34. Therefore, it is important to reduce such noise sources as much as possible. Frictional drag between 28 and actuator arm 22 can be avoided only where these two bodies circle about a common axis. Friction may also occur in the bearings used to support rotary stage 30, such as base air bearing 34 (FIG. 1). The combination of self-alignment and frictionless bearing features at STW bearing axis 32 was until now lacking in the prior STW art.

The prior art is replete with techniques for writing servotrack information; however, none appear to reduce transmission error by a STW system for servowriting a plurality of HDAs. For example, U.S. Pat. No. 3,875,589 discloses a modular STW system for writing servo-control data simultaneously to several disks for one HDA. However, the modular design is inadequate for writing several HDAs simultaneously. Further, the geometry of the disclosed design introduces head-positioning error and the system does not include a self-aligning feature for frictionless bearings.

U.S. Pat. Nos. 4,414,589 and 5,465,182 each disclose a writing servo-information on a disk surface with components for servo-track writing that are also used for normal reading and writing. The head actuator motor is used to position the head for a servo-track writing operation. This technique is inadequate for simultaneously writing several HDAs at once. In particular, it is inadequate for writing multiple HDAs each having an embedded servopattern. Further, neither reference discloses a self-aligning feature for frictionless bearings.

The main deficiency in the art is the lack of means to account for head-positioning error contributed by the STW system when simultaneously writing servopatterns to a plurality of disk surfaces in a plurality of HDAs. Another significant drawback is the presence of unwanted frictional noise sources. Until a STW system for writing servopatterns to a plurality of disk surfaces in a plurality of HDAs without transmission error or significant frictional noise, practitioners in the art are obliged to accept restrictive track density manufacturing limits. These problems are clearly felt in the art and are solved by this invention as follows.

SUMMARY OF THE INVENTION

This invention provides a servo-track writing (STW) system including stationary apparatus for positioning a plurality of disk drive head-disk assemblies (HDAs) in a spaced relationship during a servowriting operation with a rotatable push-tower apparatus that provides precise control of each read/write head position relative to a corresponding disk surface while writing servopatterns simultaneously in the HDA plurality. A retroreflector displacement sensor is fixed to the rotatable push-tower apparatus such that the sensor position indirectly and simultaneously represents the read/write head displacement relative to the respective disk surface in each of the HDA plurality. This invention coaxially aligns each HDA actuator arm pivot axis with the STW bearing axis and the respective engaging pin axis to reduce head-positioning errors caused by retroreflector sensor transmission error and supports the distal push-tower shaft with a self-aligning air bearing to reduce head-positioning errors caused by friction noise.

The rotatable push-tower apparatus of this invention is coupled to a drive shaft that is turned in a base air bearing by a STW motor hereinafter alternatively referred to as a "push-tower motor". The STW motor turns the drive shaft on a shaft axis that is defined by the drive shaft. The base air bearing defines a STW bearing axis coaxial with the shaft axis about which the rotatable push-tower apparatus revolves as the shaft turns. The STW bearing axis is disposed coaxially with a sensor axis about which the retroreflector displacement sensor circles as the shaft turns.

The stationary apparatus includes a plurality of stationery HDA mounting stations, each disposed in a relationship with a respective extended engaging pin fixed to the rotary push-tower apparatus for engaging a corresponding HDA actuator arm. Each station accepts one HDA in an arrangement that coaxially positions, with respect to the STW bearing axis, the HDA pivot axis about which the HDA read/write head circles responsive to any actuator arm motion urged by the respective extending engaging pin during push-tower rotation. Because each engaging pin is fixedly-coupled to the rotatable push-tower apparatus, it circles about a pin axis disposed coaxially with the STW bearing axis. The coaxial alignment of each HDA pivot axis with the STW bearing axis solve the transmission error and frictional drag problems arising from the lateral (and angular) displacement of pin axis from pivot axis previously known in the STW system art.

Another feature of this invention is the introduction of a second distal self-aligning air bearing for supporting push-tower apparatus rotation in cooperation with the base air bearing. The distal air bearing is substantially frictionless to avoid friction noise and is self-aligning to ensure accurate assumption of the coaxially-aligned STW bearing axis without inhibiting rotation.

This invention further includes a method of coaxially aligning and stacking a plurality of HDAs in relationship with a rotary push-tower apparatus having engaging pin assemblies each for engaging an actuator arm of a mounted HDA. After HDA mounting and alignment, a self-aligning distal air bearing is coupled to the rotary push-tower apparatus via an upper journal shaft. After coupling and self-alignment of the distal air bearing, the disk surfaces in each HDA are rotated and the push-tower is turned by the STW system motor to move all engaging pins against the respective HDA actuator arms, thereby changing the respective read/write head positions. Each HDA head position in the HDA plurality is indirectly sensed by the reflection from the retroreflector displacement sensor of a laser beam to an interferometer and receiver, which creates an electronic signal indicative of HDA head position for use in controlling a servo-writing signal at the HDA read/write heads.

BRIEF DESCRIPTION OF THE DRAWING

Other objects and advantages of this invention will become more apparent from the detailed description below when read in view of the accompanying drawing in which.

DETAILED DESCRIPTION OF THE PREFERRED EMBODIMENTS

Figure 3:
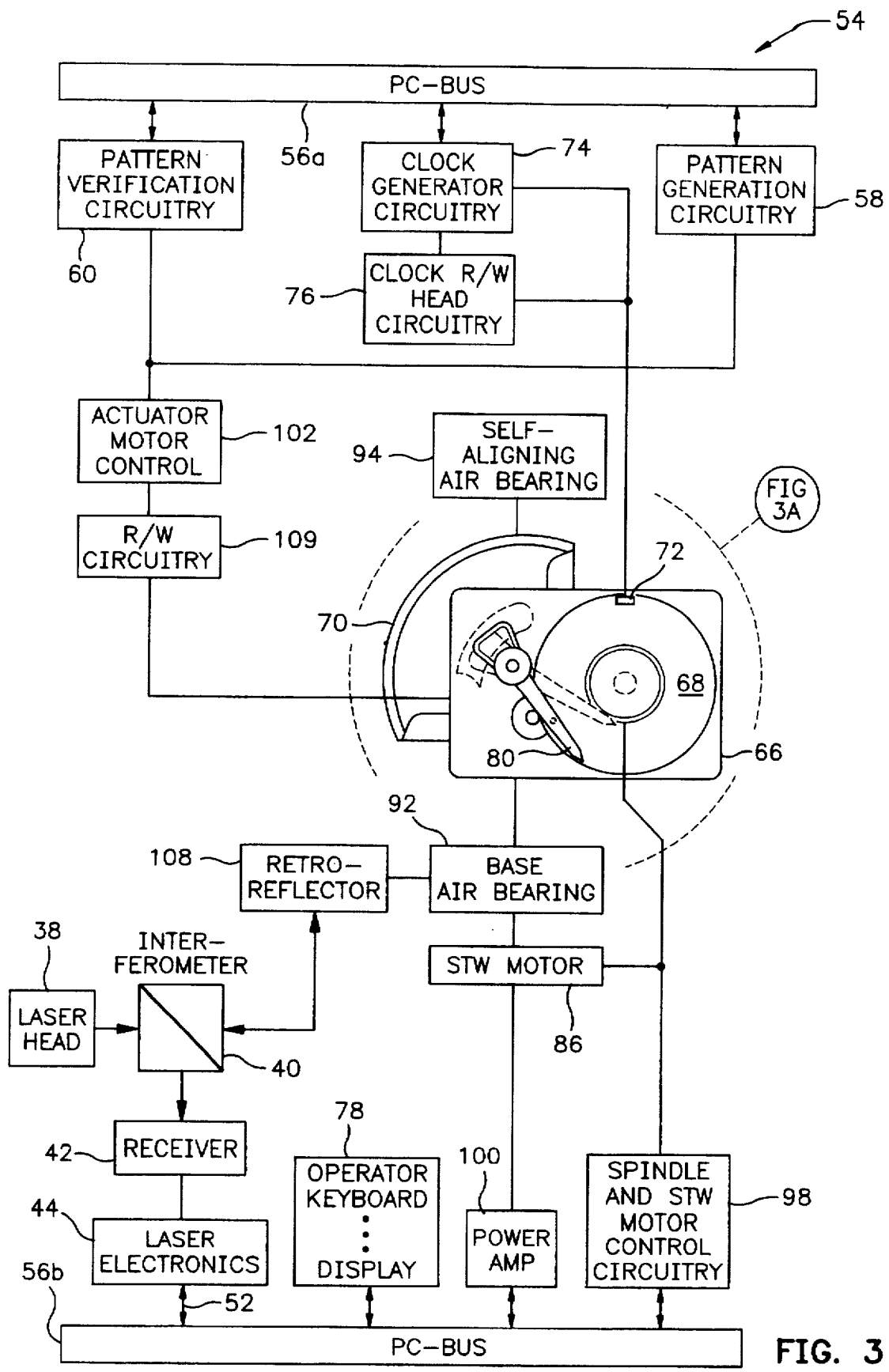
FIG. 3, including detail
Figure 3A:
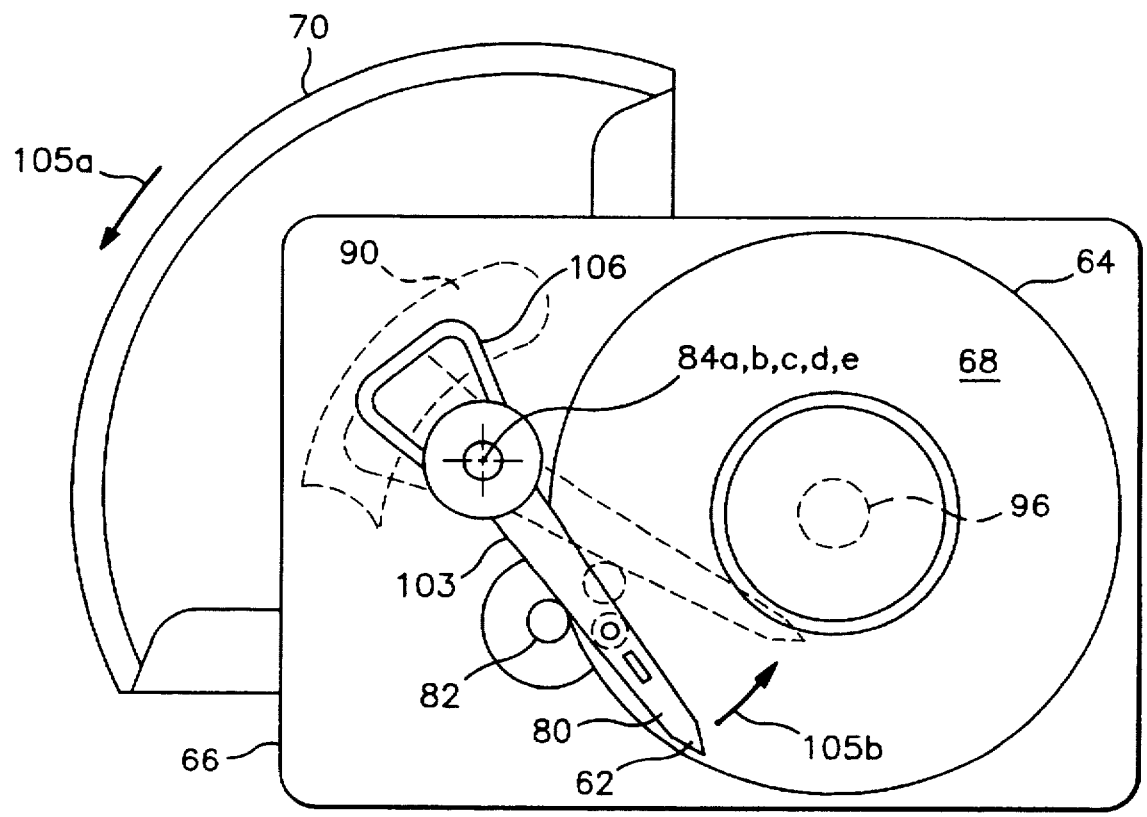
FIG. 3a, is a block diagram of a preferred embodiment of the STW system of this invention.

Reference is now made to the drawing in which like numbers throughout the various figures represents the same or similar elements. FIG. 3 shows a STW system 54 in which this invention operates. PC-Bus 56a and 56b are used to carry system signals and are shown as two buses for the sake of clarity, but the illustrated arrangement of the PC-Bus is simply a design choice and could be shown as any other number of buses. The servopattern generator circuitry 58 and the servopattern verification circuitry 60 are used to create and test the servopattern that is written by a head 62 to a disk 64 on the head-disk assembly (HDA) 66 shown in detail FIG. 3a. STW system 54 can write simultaneously to a plurality of disk surfaces on a plurality of HDAs, but for the sake of simplicity only one HDA 66 having a disk surface 68 is shown. Several HDAs 66a-c (FIG. 9) may be simultaneously positioned for engagement by a rotary push-tower apparatus 70.

A clock read/write head 72 is controlled by the clock generator circuitry 74 and the clock head circuitry 76. Clock head 72 generates and writes a series of highly accurate pulses in a track called the "clock track" in the usual manner known in the art. Generally, the clock track is used for circumferential positioning of transitions used in servo-bursts and generally for synchronization. It is preferable that an operator keyboard and display 78 be provided in STW system 54 for use by a skilled technician to control and test the results of the clock track and servopattern recording operations before ending the process.

Referring again to FIG. 3 and FIG. 3a in particular, the system operational environment and the various component functions are now described. Generally, read/write head 62 moves with the actuator arm 80 as it is positioned relative to surface 68 of disk 64 by an engaging pin 82 that pushes against and moves actuator arm 80 responsive to the turning of rotary push-tower apparatus 70 in the direction indicated by the arrow 105a about a STW bearing axis 84a by the push-tower motor 86 coupled through a drive shaft 88 (FIG. 5), which turns on a shaft axis 84b. Engaging pin 82 moves in an arcuate path indicated by the arrow 105b about a pin axis 84c disposed coaxially with both STW bearing axis 84a and shaft axis 84b. As it is pushed by engaging pin 82, head 62 moves in an arcuate path around the HDA's actuator pivot axis 84d defined by a pivot bearing (not shown) that supports actuator arm 80 with respect to the actuator motor 90 in a manner well-known in the disk drive art. Drive shaft 88 (FIG. 5) is rotationally supported by a base air bearing 92 that is nearly frictionless. Rotary push-tower apparatus 70 engages several HDAs 66a-c that are supported in a spaced relationship (FIG. 9) by a separate structure (not shown), each configured substantially like exemplary HDA 66 shown in FIG. 3a. Each of the mechanical components, including rotary push-tower apparatus 70 and the associated motor and bearings are further discussed below with reference to FIGS. 5–9.

Figure 1:
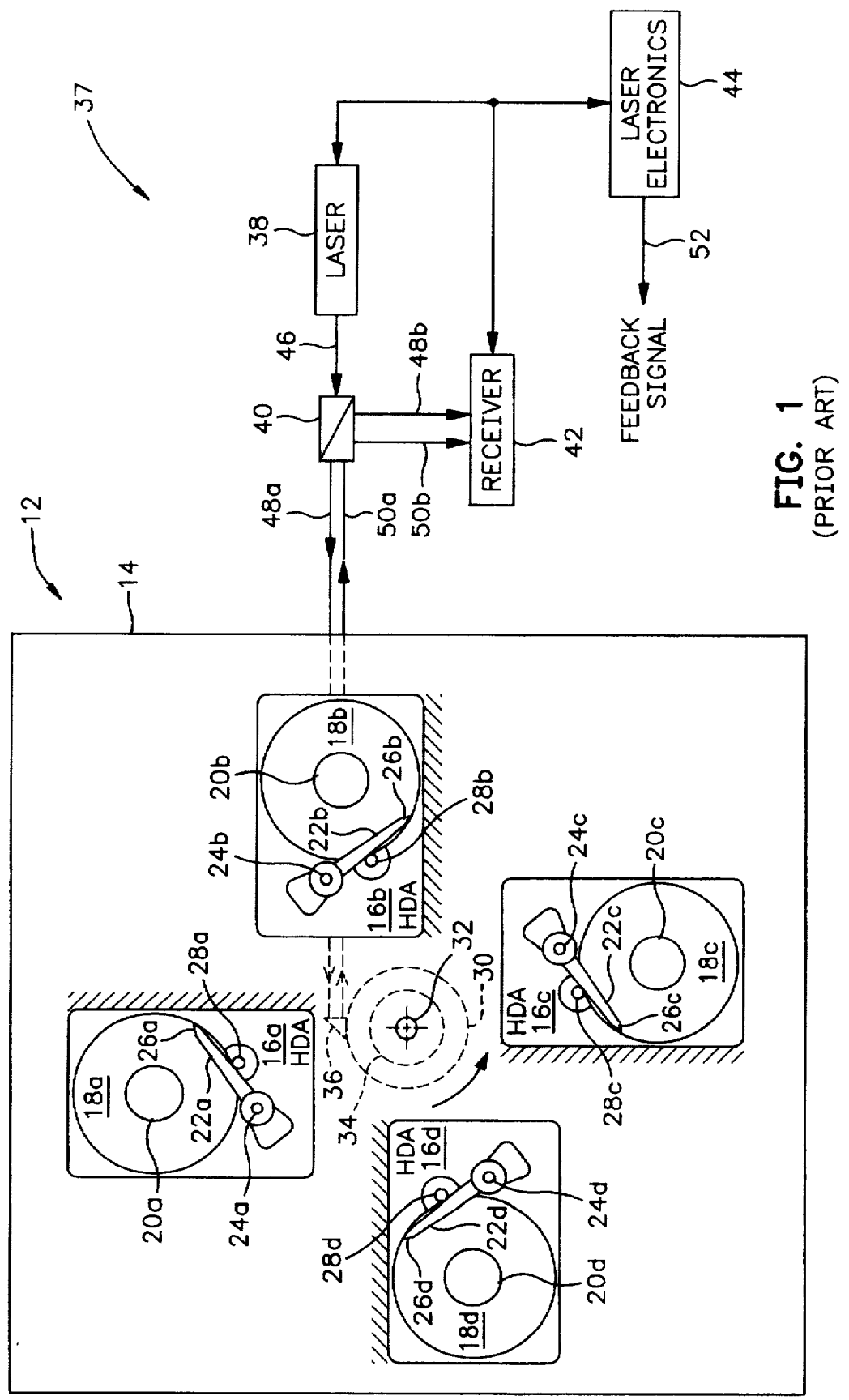
FIG. 1 is a schematic diagram of a servo-track writer (STW) system from the prior art for simultaneously writing servo information on a plurality of disk surfaces in a plurality of head-disk assemblies (HDAs)

The configuration of rotary push-tower apparatus 70 used to provide the above-described coaxial alignments in STW system 54 for the first time necessitates precise rotational support distal to base air bearing 92, which alone is sufficient to precisely support the earlier horizontal STW system 12 (FIG. 1). The inventor has critically recognized that such distal support must be as frictionless as possible to minimize head position errors arising from bearing friction noise and must be precisely realigned with STW bearing axis 84a of base air bearing 92 after installing a group of HDAs. Accordingly, in the apparatus of this invention, a self-aligning distal air bearing 94 is disposed at shaft axis 84b. A self-aligning air bearing suitable for use as distal air bearing 94 is described briefly below with reference to FIG. 5 and more completely in the above-cited copending Szeremeta application.

As rotation of rotary push-tower apparatus 70 moves engaging pin 82 against actuator arm 80, a back bias current is applied to actuator motor 90 to force actuator arm 80 firmly against engaging pin 82. During a servo-track writing operation, a spindle motor 96 rotates disk 64 such that head 62 flies above disk surface 68 on an air film in the usual manner. Generally, the motor drive circuitry 98 controls spindle motor 96 and push-tower motor 86, although the independent circuit elements for controlling each motor are omitted from FIG. 3 for simplicity of illustration. A power amplifier 100 boosts current to push-tower motor 86. The actuator motor control circuitry 102 controls actuator motor 90.

HDA 66 in FIG. 3 includes disk 64 on which the positioning information is to be written while engaged with rotary push-tower apparatus 70 and spun by spindle motor 96. HDA 66 is then lowered such that engaging pin 82 extends into it and abuts the side surface 103 of actuator arm 80. Note that shaft axis 84*b* of rotary push-tower apparatus 70 and each HDA's actuator pivot axis 84*d* is aligned to eliminate, or at least minimize, any angular offset. STW bearing axis 84*a* of the STW apparatus 104 (FIG. 5) and pivot axis 84*d* of each HDA actuator arm 80 are coaxially aligned throughout to achieve the advantages of this invention described herein.

During the servowriting cycle, push-tower motor 86 (FIG. 5) rotates rotary push-tower apparatus 70 in the direction of the arrow 105*a*. Actuator arm 80 is biased against actuator engaging pin 82 using the actuator coil 106 and actuator motor 90. As it does so, actuator engaging pin 82 pushes actuator arm 80 in the direction of arrow 105*b*. Actuator arm 80 is moved eventually to a position (shown in phantom line) at the inner rim of disk 64 where the servowriting operation concludes. HDA 66 can now be removed from STW apparatus 104 and sent for testing, packaging, and shipment to the customer.

Figure 9:
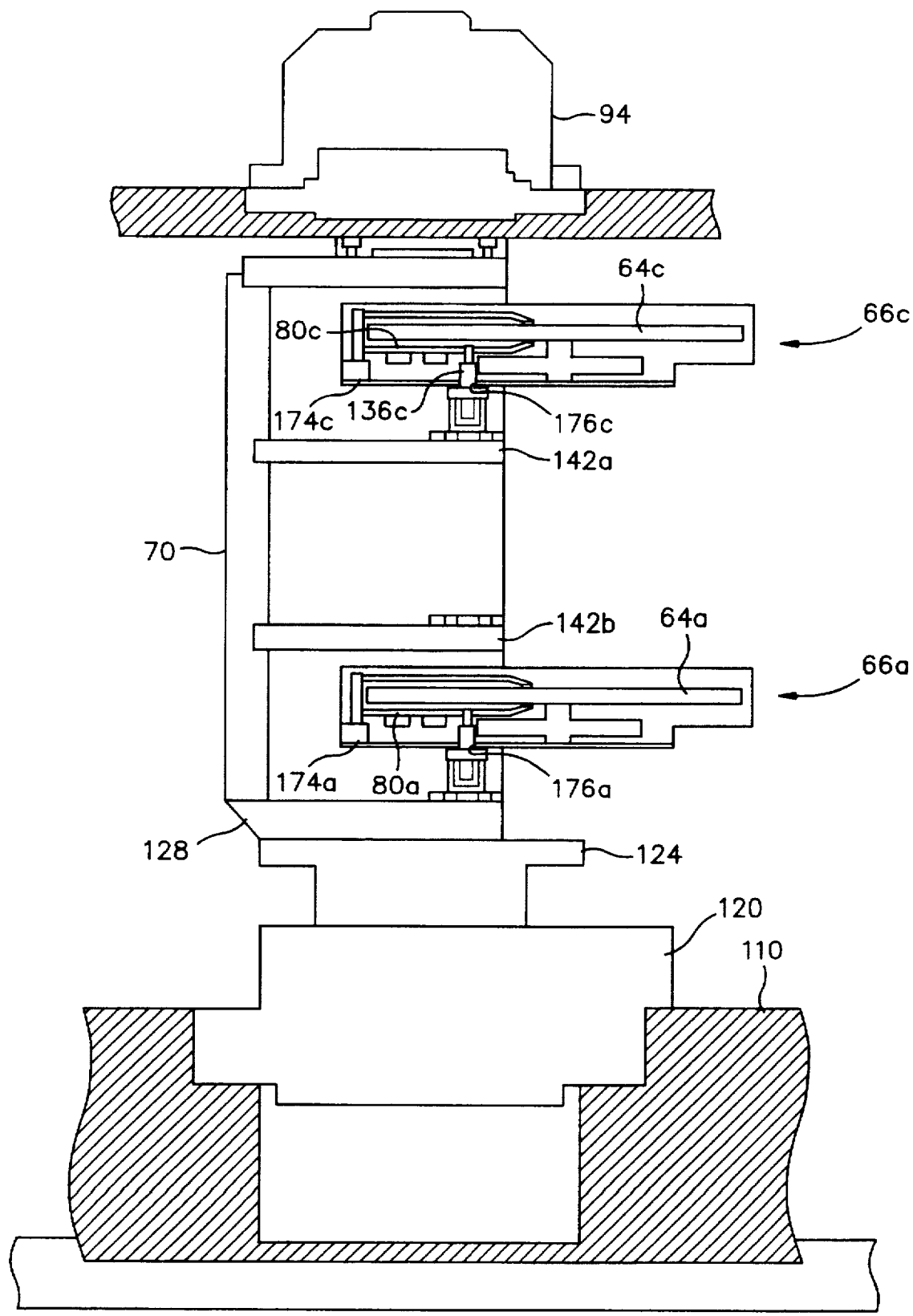
FIG. 9 is a schematic plan side view of the apparatus of FIG. 5 with transparent schematic representations showing two HDAs positioned for a servowriting cycle.

As rotary push-tower apparatus 70 turns, the attached retroreflector displacement sensor 108 moves in an arcuate path about a sensor axis 84*e*, which is disposed coaxially with STW bearing axis 84*a*. Recall that STW bearing axis 84*a* coincides with pivot axis 84*d* when HDA 66 is properly positioned in the supporting structure (FIG. 9 below). Retroreflector sensor 108 cooperates with interferometer mirror 40, receiver 42, laser 38, and laser electronics 44 in a well-known manner such as that described above for horizontal STW system 12 (FIG. 1) to produce and send rotary position signals on line 52 from electronics 44 to PC-bus 56*b*. In general, laser electronics 44 interacts with actuator motor 90 and related components 38 and 42 to position head 62 using position feedback signals in a closed loop. Head 62 position is successively corrected by sending error signals to push-tower motor 86 to effect changes in engaging pin 82 position. A desired servopattern is created on disk 64 by feeding back retroreflector sensor 108 position information from receiver 42 as head 62 writes servo-track information under the control of the read/write circuitry 109.

The above-described configuration achieves coaxial alignment of pivot axis 84*d*, STW bearing axis 84*a* and shaft axis 84*b*. The inventor has critically recognized that this coaxial alignment is necessary to eliminate transmission error arising from changes in angular displacement between head 62 and retroreflector sensor 108 during a servo-writing operation. Further, this eliminates all relative motion and thus all frictional drag between engaging pin 82 and actuator arm 80, reducing head-positioning error arising from friction noise during a servo-writing operation. Overall, this coaxial alignment improvement significantly reduces the head-positioning error contributed by STW system 54.

Figure 2:
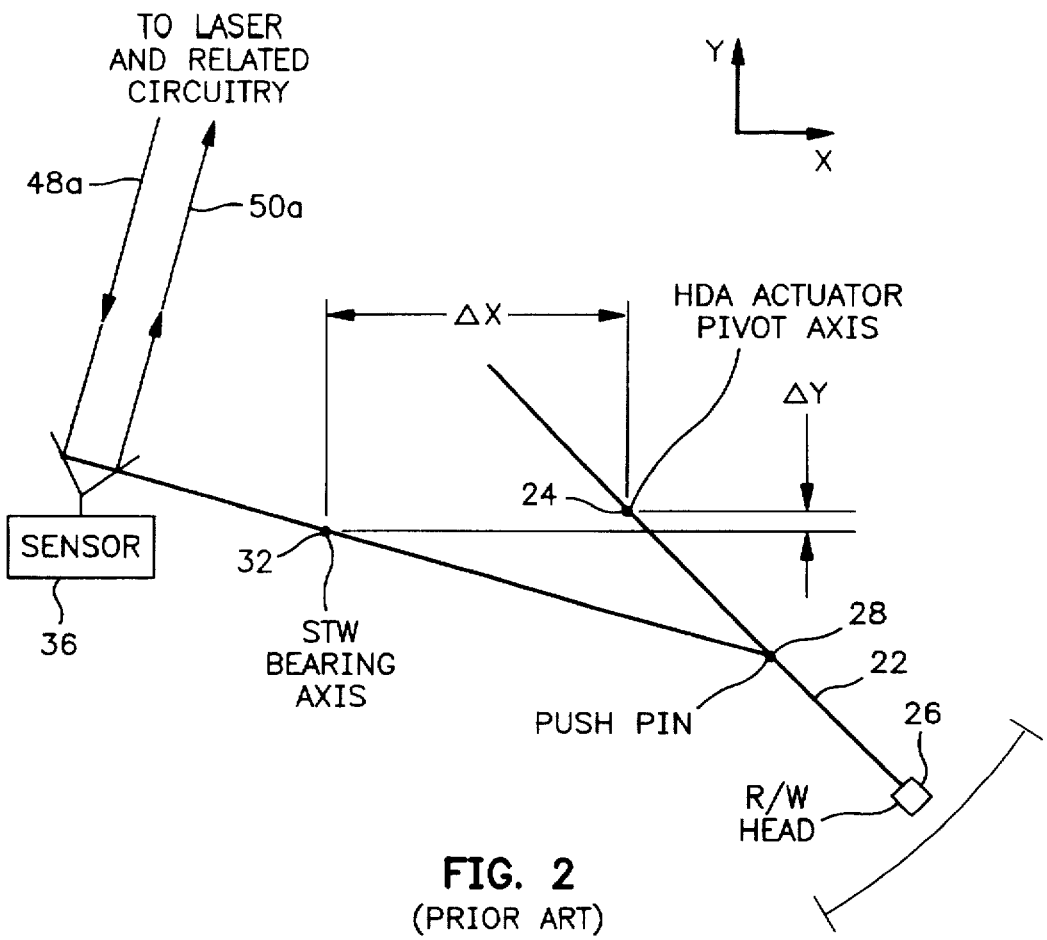
FIG. 2 is a schematic free-body diagram of the STW system from FIG. 1 illustrating the source of the transmission error problem known in the art.
Figure 4:
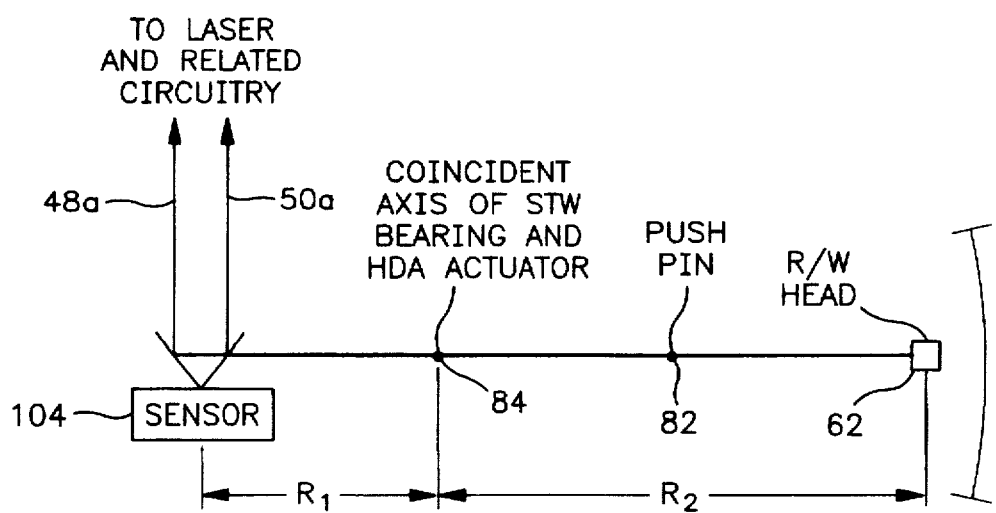
FIG. 4 is a schematic free-body diagram illustrating the elimination of transmission error in the system of FIG. 3.

FIG. 4 shows a free-body diagram that illustrates the advantages of the coaxial alignment improvements of this invention in reducing head-positioning error contributed by STW system 54. Recall that in horizontal STW system 12 described above with reference to FIGS. 1 and 2, the transmission factor error is affected by both linear and angular displacement. The inventor has recognized that stacking the HDAs in rotary push-tower apparatus 70 driven by push-tower motor 86 with coaxial alignment of pivot axis 84*d* and sensor axis 84*e* eliminates displacement between head 62 and retroreflector sensor 108 during STW servo-writing operation when rotary push-tower apparatus 70 is in motion. Therefore, it is only necessary to account for the relative linear displacement differences between head 62 and retroreflector sensor 108. As shown in FIG. 4, that displacement differences are simply related to the ratio of the distance $R_2$ from head 62 to shaft axis 84*b* and the distance $R_1$ of retroreflector sensor 108 from shaft axis 84*b*.

The apparatus of this invention for the first time combines coaxial alignment to eliminate angular displacement and frictional drag and self-aligning bearing means in a rotary apparatus that allows the simultaneous servo-track writing of disk surfaces in a plurality of HDAs, providing simultaneous servopattern manufacture in a plurality of high-capacity disk drives with an acceptably low head-positioning error budget. This invention arises from the inventor's observance of favorable results obtained by coaxially aligning the various axes and minimizing frictional noise during simultaneous servo-writing of a plurality of disk surfaces in a plurality of HDAs. Because of the reduced transmission error, rotary push-tower apparatus 70 of this invention allows STW system 54 to simultaneously write multiple HDAs with servo-track information while holding head-positioning error contributed by STW system 54 to about 24 nanometers (0.95 microinches). Recall that the prior art head-positioning error contributed by horizontal STW system 12 of FIG. 1 is about 83 nanometers (3.3 microinches), which is unacceptable for track densities of 240 tpmm (6000 tpi) or more if STW system error is limited to 1% of the track pitch, which is about 4200 nanometers (170 microinches). However, the STW error budge of 24 nanometers made possible with this invention can accommodate track densities up to 400 tpmm (10,000 tpi) or more.

Figure 5:
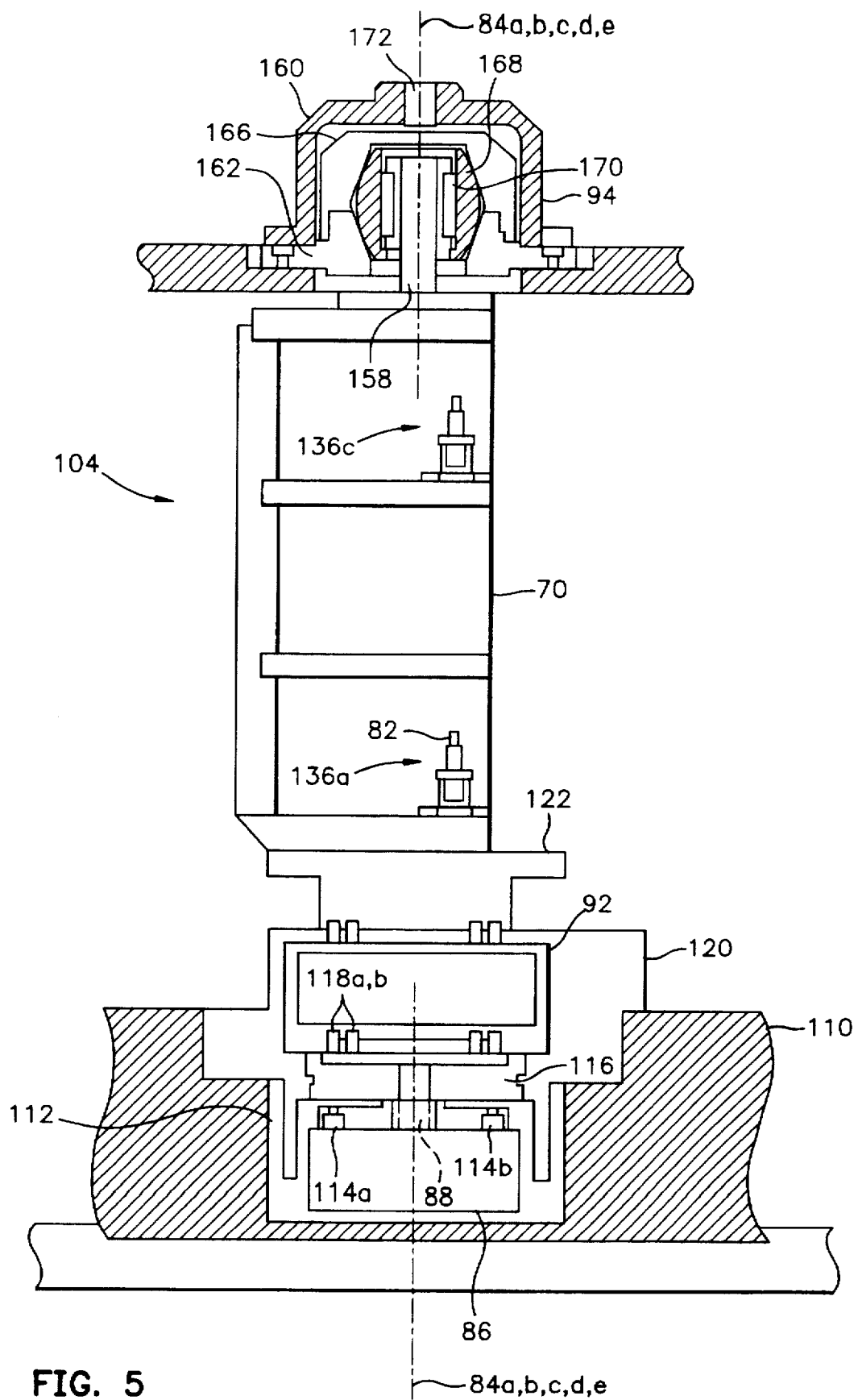
FIG. 5 is a schematic plan side view of the preferred embodiment of the apparatus of this invention showing partial cross-sections.

FIG. 5 is a schematic diagram showing rotary STW apparatus 104 suitable for use with STW system 54, which is described above with reference to FIG. 3. STW apparatus 104 includes rotary push-tower apparatus 70, which engages several HDAs (FIG. 9) that are supported in a spaced relationship by a separate structure (not shown). To limit the effects of external vibration and other forces lending to instability, STW apparatus 104 is configured to be coupled with a firm foundation 110 of a material of high mass density such as granite. Push-tower motor 86 is captured by an aperture 112 through foundation 110. A voice-coil motor is preferred for push-tower motor 86 because of the precision movement it offers, although a stepper motor can be substituted if high precision is available. Push-tower motor 86 is coupled by the fasteners 114*a* and 114*b* to an adapter 116 including the prongs 118*a* and 118*b*. Rotary motion is transferred via drive shaft 88 through adapter 116 to base air bearing 92.

Base air bearing 92 is coupled to push-tower motor 86 in any useful fashion known in the art. Base air bearing 92 can be a typical commercially-available air bearing, such as the model 3R manufactured by Professional Instruments Company of Minneapolis, Minn. Appropriate interfacing, air supply, and the like (not shown), are preferably provided in a manner known to a person skilled in the air bearing art. An air bearing housing 120 is designed to fit in a complementary recess of foundation 110 to provide a measure of stability to the components mounted on top of base air bearing 92. A push-tower mounting adapter 122 is provided to attach rotary push-tower apparatus 70 to base air bearing 92.

Figure 6:
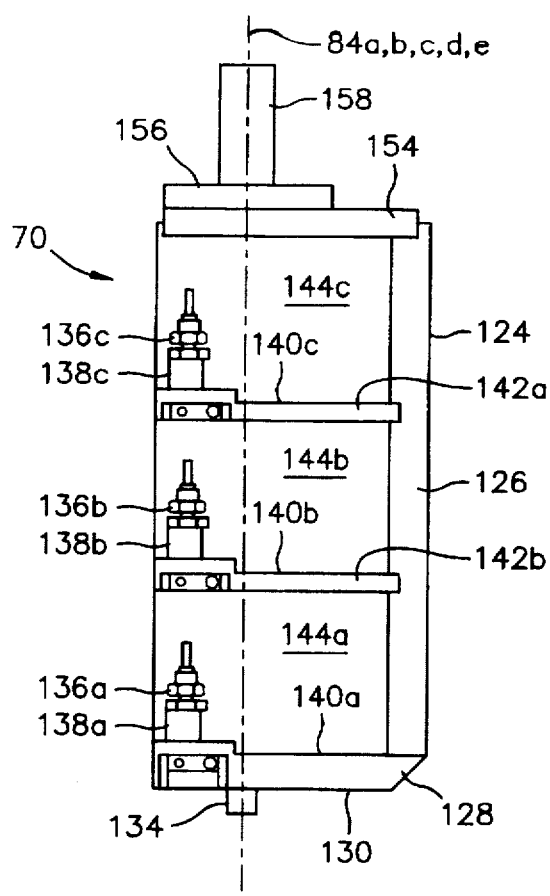
FIG. 6 is a schematic plan side view rotated 90° of the push-tower mechanism from the apparatus of FIG. 5.
Figure 7:
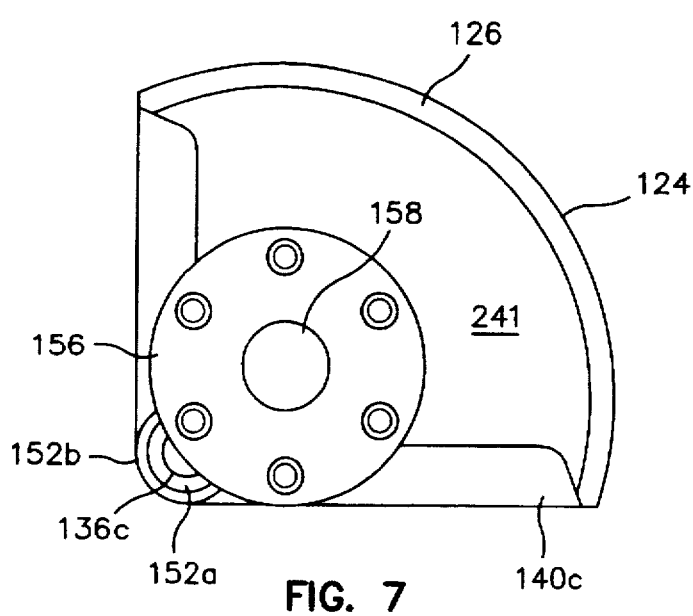
FIG. 7 is a schematic plan top view of the push-tower mechanism of FIG. 6.

Referring to FIGS. 6 and 7, rotary push-tower apparatus 70 is shown detached from STW apparatus 104 of FIG. 5. A main body 125 of rotary push-tower apparatus 70 is generally shaped as a cylinder quarter-section or less. That is, main body 124 is an approximate right-angle cylindrical section with a curved outer wall 126. A push-tower base plate 128 is provided for resting push-tower main body 124 with a bottom surface 130 that abuts the top surface 132 of push-tower mounting adapter 122 (see FIG. 5). Plate 128 is generally conformed in shape to a quadrant or less of a circular plate having the similar right-angle shape and radius as cylinder wall 126. A lower push-tower shaft member 134 descends from push-tower base plate 128 for coupling rotary push-tower apparatus 70 to base air bearing 92 as shown in FIG. 5.

The three engaging pins 136a, 136b, and 136c are each provided with a compatible mount 138a, 138b and 138c, each fixed to a respective plate surface 140a, 140b, and 140c are fixedly mounted to rotary push-tower apparatus 70 within the space defined by main body 124 cylindrical quadrant shape. The two push-tower cross plates 142a and 142b are disposed to substantially trisect the space defined by the cylindrically-walled quadrant shape occupied by main body 124, thereby defining the three cylindrical spatial HDA receiving stations 144a, 144b and 144c disposed to receive at least a portion of individual HDAs 66a–c therein without interference with main body 124 during rotation. Each engaging pin 136a–c engages a respective HDA 66a–c in each station 144a–c as shown. Preferable, fixedly-mounted HDAs 66a–c are supported by a separate structure (not shown).

As will be recognized by a person skilled in the art, a variety of configuration for rotary push-tower apparatus 70 can be designed in accordance with this invention. While three HDA receiving stations 144a–c are shown, two, four, or even more than four such stations could be provided within the spirit and purpose of this invention. Rotary push-tower apparatus 70 should be of a sturdy construction, such as a stainless steel fabrication for example, to ensure the necessary dimensional stability to STW apparatus 104 during operation.

Figure 8:
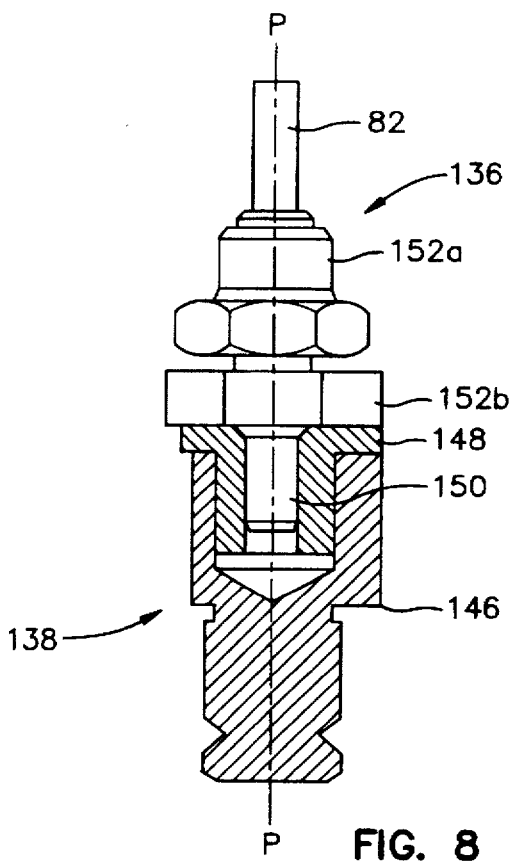
FIG. 8 is a cross-sectional side view of an exemplary engaging pin assembly from the push-tower mechanism of FIG. 7.

An exemplary engaging pin assembly is shown in FIG. 8. While a variety of designs can be envisioned, in this invention a plug member 146 is adapted to be received in any compatible mount such as mounts 138a–c shown in FIG. 6. Plug member 146 includes a socket member 148 adapted to receive a pin shaft 150 therein. The HDA actuator engaging pin 82 protrudes from the fastener elements 152a and 152b to extend from each platform surface 140a–c when assembled with rotary push-tower apparatus 70.

Returning to FIG. 6 and 7, a push-tower top plate 154 acts as a mount for an upper shaft mounting plate 156 and the push-tower journal shaft 158 extending from main body 124. Note that shaft axis 84b is disposed to be coaxial with pivot axis 84d of each HDA actuator arm located in receiving stations 144a–c. This coaxial alignment, described above with reference to FIGS. 3 and 4, significantly reduces transmission error and frictional drag. As rotary push-tower apparatus 70 is rotated about its axis, each engaging pin 82 (see FIG. 8) travels in an arcuate path about shaft axis 84b, each abutting or otherwise engaging a respective actuator arm 80 in a respective HDA 66 into which engaging pin 82 is inserted during positioning for HDA engagement in a respective station 144. The path length is defined by the radial distance from shaft axis 84b to the centerline P—P (FIG. 8)

Returning to FIG. 5, rotary push-tower apparatus 70 is coupled to self-aligning distal air bearing 94 via upper push-tower shaft 158 to give additional stability. A self-aligning air bearing and method of operation compatible with such an application is disclosed in the above-cited copending Szeremeta application. Self-aligning distal air bearing 94 has a bearing case 160 that in combination with a bottom race 162 defines a central chamber 164. A top race 166 in combination with bottom race 162 contains a truncated spherical bearing sleeve 168 and an air gland 170. Air gland 170 is fixed as a bushing within hearing sleeve 168 and receives push-tower journal shaft 158 as a bearing journal. Air (or another gas) is pumped into distal air bearing 94 to form the interface between air gland 170 and upper push-tower shaft 158. When the pressurized air is received in air gland 170, pressure differentials cause bearing sleeve 168 to move in response to pressurized air movement, thereby aligning distal air bearing 94 with shaft axis 84b of upper push-tower shaft 158 when a uniform air pressure is obtained in the gland. Following such alignment, top race 166 can then be locked down onto bearing sleeve 168 using a locking device 172. The preferred embodiment includes spring-loaded plunger locking device 172.

As shown in FIG. 9, several HDAs 66a–b can be presented to rotary push-tower apparatus 70. Main body 124 (see FIG. 6) is designed such that at least a portion of HDA 66 is received in station 144 (FIG. 6) without interference with push-tower main body 124. The HDA insertion process may be manual or automated (insertion apparatus not shown). The base plates 174a–b for every HDA 66 are each provided with a slot 176 for receiving engaging pin 82 (see FIG. 8) therethrough. Enough clearance can be provided in each tower station 144 such that HDA 66 may be inserted and then lowered to receive actuator engaging pin 82 into HDA 66. Each actuator engaging pin 82 of each engaging pin assembly 136 abuts, or engages, a respective HDA's actuator arm 80 when rotary push-tower apparatus 70 is in a predetermined rotational "home" position. At this home position, HDA actuator arm 80 is at a radial extremity of HDA 66, usually adjacent the outer rim. Actuator engaging pin 82 comes through slot 176 in base plate 174 of HDA 66 and contacts actuator arm 80 to translate motion from rotary push-tower apparatus 70 to actuator arm 80 as HDA 66 remains stationary in its receiving station 144.

The foregoing description of the preferred embodiment of this invention is presented for purposes of illustration and description and it is not intended to be exhaustive or to limit the invention. Modifications and variations may occur to practitioners skilled in this art. Therefore, the invention is not to be limited in any way except by the claims appended below which together with their equivalents define the spirit and the scope of this invention.

I claim:

1. In a servo-track writer (STW) system for simultaneously writing servo information on each of a plurality of tracks on each of a plurality of rotatable disk surfaces in a plurality of head-disk assemblies (HDAs) each having at least one rotatable disk surface and a corresponding read/write head fixed to a head actuator arm that is rotatably coupled to an actuator arm pivot bearing defining a HDA pivot axis about which the read/write head is disposed to move along a first arcuate path, a combination for positioning the read/write head relative to the rotatable disk surface, the combination comprising:

an STW motor assembly having a motor and a drive shaft;

a base bearing coupled to the STW drive shaft and have a STW bearing axis;

a push-tower having an elongated body with one of two ends rotatably coupled to the base bearing and disposed to turn about the STW bearing axis in response to rotation of the drive shaft;

a plurality of aligned HDA receiving stations each disposed with respect to the push-tower to receive a HDA such that each received HDA pivot axis is disposed coaxially with the STW bearing axis;

a plurality of engaging pins each fixed to the push-tower and disposed with respect to a respective HDA receiving station to move along a second arcuate path about the STW bearing axis in response to push-tower rotation and thereby to engage and push against the head actuator arm within the respective received HDA;

a displacement sensor coupled to the push-tower and disposed to move along a third arcuate path about the STW bearing axis;

a self-aligning distal gas bearing coupled to the push-tower for rotationally supporting the push-tower end distal to the base bearing; and means coupled to the STW drive shaft for detecting displacement sensor position and for generating a control signal for turning the STW motor to position the read/write head within at least one received HDA.

2. The combination of claim 1 wherein:
the self-aligning distal gas bearing is an air bearing.

3. The combination of claim 2 further comprising:
a journal shaft fixed to the distal end of the push-tower and disposed to rotate within the self-aligning distal gas bearing about the STW bearing axis responsive to push-tower rotation.

4. The combination of claim 3 further comprising:
in the self-aligning air bearing, a bearing sleeve member that is disposed symmetrically about the STW bearing axis.

5. The combination of claim 1, wherein the push-tower further comprises:
a bottom plate for coupling the elongated body to the base bearing;
a top plate for coupling the elongated body to the journal shaft such that the journal shaft is aligned with the STW bearing axis;
a section wall in the elongated body extending between the top and bottom plates;
a plurality of cross plates extending each outwardly from the section wall within a space defined by the section wall to define a HDA receiving station;
an engaging pin assembly including a head actuator arm engaging pin mounted on fixed to each cross plates.

6. The combination of claim 1 further comprising:
a force-isolating mass structure surrounding the STW motor assembly and the base bearing.

7. The combination of claim 6 wherein:
the force-isolating mass structure is composed of granite.

8. A push-tower apparatus for simultaneously positioning read/write heads in a plurality of head-disk assemblies (HDAs) in a servo-track writer (STW) system for writing servo information on each of a plurality of tracks on each of a plurality or rotatable disk surfaces in the HDA plurality, each HDA having at least one rotatable disk surface and a corresponding read/write head fixed to a head actuator arm that is rotatably coupled to an actuator arm pivot bearing defining a HDA pivot axis about which the read/write head is disposed to move along a first arcuate path, the STW system having an STW motor assembly including a motor and a drive shaft, a base bearing coupled to the STW drive shaft and having a STW bearing axis, and a displacement sensor coupled to the drive shaft and disposed to move along a second arcuate path about the STW bearing axis responsive to rotation of the drive shaft, the push-tower apparatus comprising:

a push-tower having an elongated body with one of two ends rotatably coupled to the base bearing and disposed to turn about the STW bearing axis in response to rotation of the drive shaft;

a plurality of aligned HDA receiving stations each disposed with respect to the push-tower to receive a HDA such that the received HDA pivot axis is disposed coaxially with the STW bearing axis;

a plurality of engaging pins each fixed to the push-tower and disposed with respect to a respective HDA receiving station to move along a second arcuate path about the STW bearing axis in response to push-tower rotation and thereby to engage and push against the head actuator arm within the respective received HDA; and a self-aligning distal gas bearing coupled to the push-tower for rotationally supporting the push-tower end distal to the base bearing.

9. The push-tower apparatus of claim 8 wherein:
the self-aligning distal gas bearing is an air bearing.

10. The push-tower apparatus of claim 9 further comprising:
a journal shaft fixed to the distal end of the push-tower and disposed to rotate within the self-aligning distal gas bearing about the STW bearing axis responsive to push-tower rotation.

11. The push-tower apparatus of claim 10 further comprising:
in the self-aligning air bearing, a bearing sleeve member that is disposed symmetrically about the STW bearing axis.

12. The push-tower apparatus of claim 8 wherein the push-tower further comprises:
a bottom plate for coupling the elongated body to the base bearing;
a top plate for coupling the elongated body to the journal shaft such that the journal shaft is aligned with the STW bearing axis;
a section wall in the elongated body extending between the top and bottom plates;
a plurality of cross plates extending each outwardly from the section wall within a space defined by the section wall to define a HDA receiving station;
an engaging pin assembly including a head actuator arm engaging pin mounted on fixed to each cross plates.

13. In a servo-track writer (STW) system for writing servo information on each of a plurality of tracks on each of a plurality of rotatable disk surfaces in a plurality of head disk assemblies (HDAs) each having at least one rotatable disk surface and a corresponding read/write head fixed to a head actuator arm that is rotatably coupled to an actuator arm pivot bearing defining a HDA pivot axis about which the read/write head is disposed to move along a first arcuate path, the STW system having an STW motor assembly including a motor and a drive shaft, a base bearing coupled to the drive shaft and having a STW bearing axis, a displacement sensor coupled to the drive shaft and disposed to move along a second arcuate path about the STW bearing axis responsive to rotation of the drive shaft, a push-tower having an elongated body with a journal shaft coupled to a first end thereof and the opposite second end rotatably coupled to the base bearing, a plurality of engaging pins fixed to the push-tower and each disposed to moves in a third arcuate path about the STW bearing axis in response to rotation of the drive shaft, a plurality of aligned HDA receiving stations each disposed to receive at least one HDA such that each received HDA pivot axis is disposed coaxially with the STW bearing axis and with respect to the push-tower so that a respective engaging pin engages the head actuator arm within the received HDA to move the attached read/write head in the first arcuate path, a method for positioning a plurality of read/write head relative to the respective disk surfaces during a servo-track writing operation, the method comprising the steps of:

(a) positioning the HDA plurality in the HDA receiving stations so that the received HDA pivot axes are all disposed coaxially with the STW bearing axis;

(b) engaging each of the received HDA plurality with a respective engaging pin such that the engaging pin is disposed to move in a third arcuate path about the STW bearing axis during a servo-track writing relationship;

(c) coupling a self-aligning air bearing to the journal shaft;

(d) rotating the plurality of rotatable disk surfaces in the HDA plurality;

(e) turning the motor to rotate the drive shaft and the push-tower;

(f) sensing the displacement sensor position during motor rotation;

(g) computing the read/write head positions responsive to the displacement sensor position; and (h) adjusting the motor rotation to provide a desired read/write head position.

* * * * *